(12) United States Patent
Chi et al.

(10) Patent No.: US 9,348,507 B2
(45) Date of Patent: May 24, 2016

(54) CONTROLLING ELECTRONIC EQUIPMENT WITH A TOUCHING-TYPE SIGNAL INPUT DEVICE

(75) Inventors: Jian Wen Chi, Shanghai (CN); Fang Liang Dong, Shanghai (CN); Chang Huang, Shanghai (CN); Zi Xuan Zhou, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1251 days.

(21) Appl. No.: 13/278,825

(22) Filed: Oct. 21, 2011

(65) Prior Publication Data

US 2012/0110495 A1 May 3, 2012

(30) Foreign Application Priority Data

Oct. 29, 2010 (CN) .......................... 2010 1 0532229

(51) Int. Cl.
*G06F 3/0482* (2013.01)
*G06F 3/0488* (2013.01)

(52) U.S. Cl.
CPC .......... *G06F 3/04883* (2013.01); *G06F 3/0482* (2013.01)

(58) Field of Classification Search
CPC .......................... G06F 3/0482; G06F 17/30884
See application file for complete search history.

(56) References Cited

U.S. PATENT DOCUMENTS 5,689,667 A * 11/1997 Kurtenbach .......... G06F 3/0482 715/810
5,943,039 A * 8/1999 Anderson ........... G06F 3/03545 345/902

(Continued)

FOREIGN PATENT DOCUMENTS

CN 101080068 A 11/2007
CN 101261565 A 9/2008

(Continued)

OTHER PUBLICATIONS

Lyons et al, "The Oval Menu—Evolution and Evaluation of a Widget," 1996, IEEE, pp. 252-259.*

(Continued)

*Primary Examiner* — Alvin Tan
(74) *Attorney, Agent, or Firm* — Lee Law, PLLC; Christopher B. Lee

(57) ABSTRACT

Electronic equipment is controlled with a touching-type signal input device. An inputted navigator-calling request is received. A request mode of the inputted navigator-calling request is compared with a predefined request mode. It is determined whether the request mode of the inputted navigator-calling request matches with the predefined request mode. A navigator is displayed in response to determining there is a match. The navigator has a set of tabs distributed on at least part of a closed structure.

18 Claims, 3 Drawing Sheets

(56) References Cited

U.S. PATENT DOCUMENTS

| | | | | |
|---|---|---|---|---|
| 6,359,635 | B1* | 3/2002 | Perttunen | G06F 17/30994 707/E17.142 |
| 6,549,219 | B2* | 4/2003 | Selker | G06F 3/0482 345/902 |
| 8,219,930 | B2* | 7/2012 | Johns | G06F 3/048 715/810 |
| 8,375,329 | B2* | 2/2013 | Drayton | G06F 3/0482 715/767 |
| 2001/0045965 | A1* | 11/2001 | Orbanes | G06F 3/0346 715/841 |
| 2002/0054166 | A1* | 5/2002 | Decombe | G06F 3/0482 715/853 |
| 2006/0048076 | A1* | 3/2006 | Vronay | G06F 3/0482 715/850 |
| 2007/0024594 | A1* | 2/2007 | Sakata | G06F 3/0488 345/173 |
| 2007/0226648 | A1* | 9/2007 | Hudson | A63F 13/10 715/810 |
| 2008/0040682 | A1 | 2/2008 | Sorenson et al. | |
| 2008/0222569 | A1* | 9/2008 | Champion | G06F 3/0482 715/834 |
| 2010/0251180 | A1* | 9/2010 | Cragun | G06F 3/04812 715/834 |
| 2010/0306702 | A1* | 12/2010 | Warner | G06F 3/0482 715/811 |
| 2011/0271230 | A1* | 11/2011 | Harris | G06F 3/0482 715/810 |
| 2012/0036434 | A1* | 2/2012 | Oberstein | G06F 3/0482 715/702 |

FOREIGN PATENT DOCUMENTS

| | | |
|---|---|---|
| CN | 101634925 A | 1/2010 |
| CN | 101676850 A | 3/2010 |
| KR | 20100033214 A | 3/2010 |

OTHER PUBLICATIONS

Author Unknown, Rainmeter Skins/Cirgular Upgrade, Webpage/site, Jan. 29, 2010, pp. 1-11, Customize.org, Published on the World Wide Web at: http://www.webcitation.org/5sFKLrHXI.

Author Unknown, CyberNotes: Must-Have Firefox Tab Manager, Webpage/site, Oct. 10, 2007, pp. 1-16, CyberNet News, Published on the World Wide Web at: http://www.webcitation.org/5sFFxnYiz.

Author Unknown, Examiner, State Intellectual Property Office of the People's Republic of China, Office Action for CN Application No. 201010532229.1 (English translation not available), Dec. 4, 2013, pp. 1-7, P.R.China.

* cited by examiner

CONTROLLING ELECTRONIC EQUIPMENT WITH A TOUCHING-TYPE SIGNAL INPUT DEVICE

RELATED APPLICATIONS

This application claims priority to and claims the benefit of Chinese Patent Application Serial No. 201010532229.1 titled "METHOD AND SYSTEM FOR CONTROLLING ELECTRONIC EQUIPMENT WITH TOUCHING-TYPE SIGNAL INPUT DEVICE," which was filed in the State Intellectual Property Office of the People's Republic of China on Oct. 29, 2010, and which is incorporated herein by reference in its entirety.

BACKGROUND

The invention relates to electronic equipment. More particularly, the present invention relates to controlling electronic equipment with a touching-type signal input device.

Groups of tabs are widely used in user interfaces of web pages, applications, and browsers. A user locates a corresponding web page or view by clicking a tab in a group of tabs, so as to switch and browse among multiple web pages or views.

BRIEF SUMMARY

A method for controlling electronic equipment with a touching-type signal input device, involves receiving an inputted navigator-calling request; comparing a request mode of the inputted navigator-calling request with a predefined request mode; determining whether the request mode of the inputted navigator-calling request matches with the predefined request mode; and displaying a navigator in response to determining there is a match, where the navigator has a plurality of tabs distributed on at least part of a closed structure.

A system for controlling electronic equipment with a touching-type signal input device includes a display and a processor programmed to receive an inputted navigator-calling request; compare a request mode of the inputted navigator-calling request with a predefined request mode; determine whether the request mode of the inputted navigator-calling request matches with the predefined request mode; and display a navigator in response to determining there is a match on the display, where the navigator has a plurality of tabs distributed on at least part of a closed structure.

A computer program product includes a computer readable storage medium including computer readable program code, where the computer readable program code when executed on a computer causes the computer to receive an inputted navigator-calling request; compare a request mode of the inputted navigator-calling request with a predefined request mode; determine whether the request mode of the inputted navigator-calling request matches with the predefined request mode; and display a navigator in response to determining there is a match, where the navigator has a plurality of tabs distributed on at least part of a closed structure.

BRIEF DESCRIPTION OF THE SEVERAL VIEWS OF THE DRAWINGS

The disclosure may be better understood from the description given below in conjunction with the accompany drawings, in which same or similar reference numbers represent the same or similar component throughout the drawings. The drawings are included in the specification and constitute a part thereof along with the detailed description below, and are used to illustrate preferred embodiments of the disclosure and explain principles and advantages of the present subject matter, in which.

DETAILED DESCRIPTION

Figure 1:
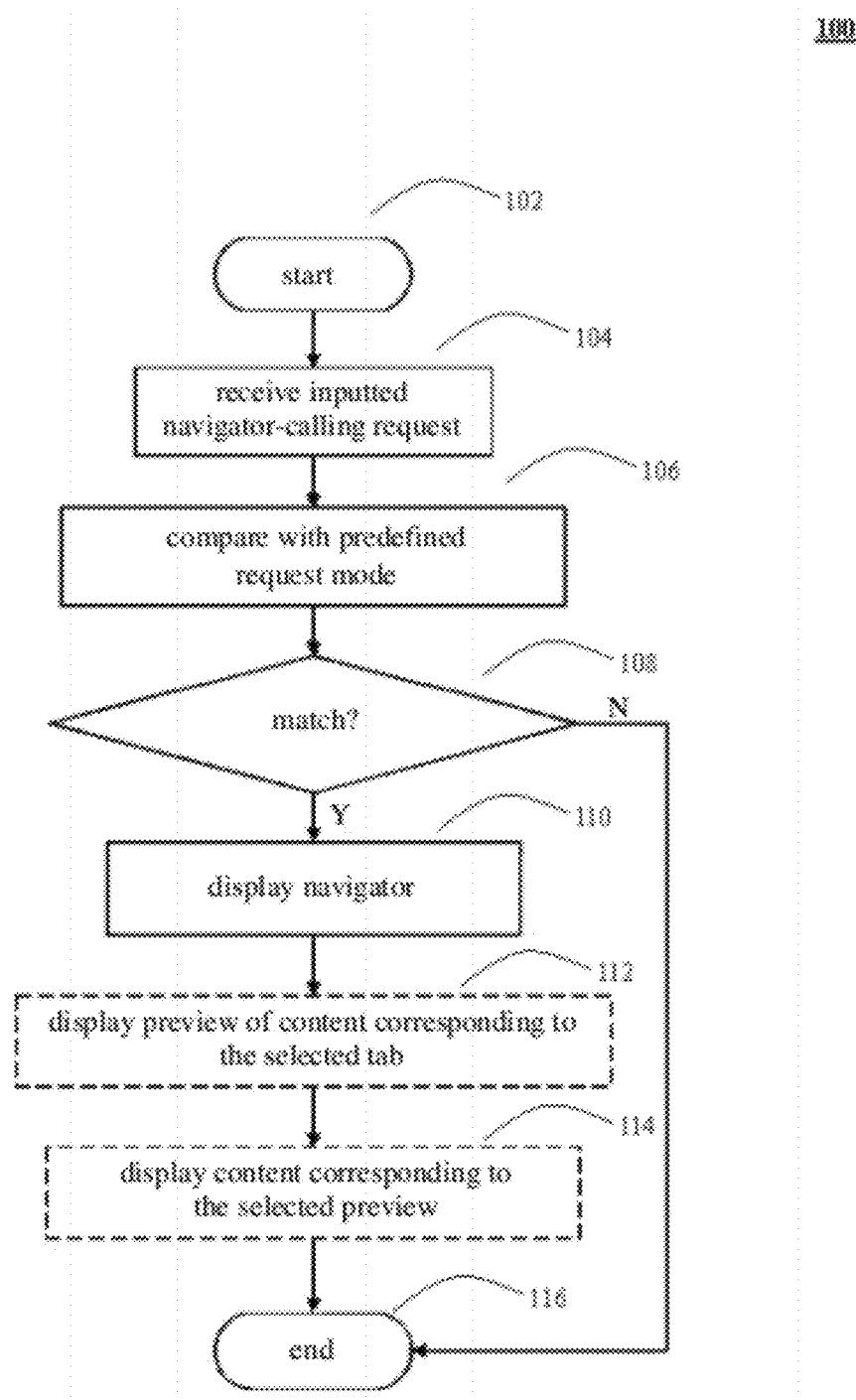
FIG. 1 is a flow chart of an example of an implementation of a process for controlling electronic equipment with a touching-type signal input device according to an embodiment of the disclosure.

Illustrative embodiments of the disclosure will be described below in conjunction with the accompanying drawings. For clarity, not all features of actual implementation are described in this specification. However, it will be appreciated that during the development of any such actual embodiment, implementation-specific decisions may be made to achieve developers' specific goals, such as compliance with system-related and business-related constraints, which may vary from one implementation to another.

It should also be noted that, in order to avoid obscuring the present subject matter with unnecessary details, only means, structures, and/or process steps that are closely associated with the solution of the present subject matter are illustrated in the drawings, and other details that have little relationship therewith are omitted.

Conception of the present subject matter resulted from recognition of certain limitations associated with conventional groupings of tabs. It was observed that conventional groupings of tabs do not take usability into consideration when the number of tabs proliferates. Taking a current popular browser for example, it was observed that tabs of opened pages will all be horizontally arranged at the head of the browser window. As a user opens many pages, the number of the generated tabs increases accordingly. As the number of tabs increases, the width of tab will be too small to be identified or located, which is prone to result in incorrect selection. At the same time, efficiency of looking up a tab is reduced as the number of tabs increases. It was additionally observed that conventional tabs do not have page preview. With the increasing popularity of electronic equipment with a touching-type signal input device, the above drawbacks in current groupings of tabs will be especially evident in the electronic equipment with a touching-type signal input device.

A method for controlling electronic equipment with a touching-type signal input device according to one example implementation of the present subject matter will be described in detail with reference to FIG. 1.

FIG. 1 is a flow chart of an example of an implementation of a process 100 for controlling electronic equipment with a touching-type signal input device. The process 100 starts at step 102. The process 100 proceeds to step 104, in which an inputted navigator-calling request is received.

At step 106, a request mode of the inputted navigator-calling request is compared with a predefined request mode.

At step 108, a determination is made as to whether the request mode of the inputted navigator-calling request matches with the predefined request mode. If there is a match, at step 110, the navigator is displayed, where the navigator has a group/set of tabs distributed on at least part of a closed structure. If there is not a match at step 108, at step 116, the process 100 ends. Additional details of the process 100 are described further below.

According to one example implementation, the request mode of the navigator-calling request is movement track/tracking. In response to receiving an inputted movement track, the inputted movement track is compared with a predefined movement track mode. If the inputted movement track matches with the predefined movement track mode, the navigator is displayed. According to another example implementation, the request mode of the navigator-calling request is a signal indicating whether a button that calls the navigator is pressed. According to still another example implementation, the request mode of the navigator-calling request is movement of the electronic equipment itself, such as a shake of the electronic equipment.

The execution of the process 100 for controlling electronic equipment with a touching-type signal input device according to the above examples will be described in detail by using a capacitor touching-type signal input device as an example. However, it should be noted that for other types of touching-type signal input devices, corresponding processing may be performed based on the type of the particular touching-type signal input device under guidance of the concepts described herein.

Next, a detailed description will be given using the request mode of the navigator-calling request as movement tracking for example. When a user's finger touches the touching-type signal input device of electronic equipment, electric charges of the touching-type signal input device flows towards the human body along the finger, and the touching-type signal input device generates location data by sensing such movement of the electric charges so as to locate a contacting point. Then, as the user's finger slides on the surface of the touching-type signal input device, capacitance of the touching-type signal input device changes accordingly, and generates movement track data of the contacting point.

The above movement track data of the contacting point is received by the electronic equipment and is processed by a process chip of the touching-type signal input device to convert it into a movement track. Then, the electronic equipment reads a predefined request mode stored in a memory (at this time, the example predefined request mode is a predefined movement track mode), and compares the received movement track mode of the movement track with the predefined movement track mode. If the result of the above comparison shows that the inputted movement track matches with the predefined movement track mode, then an instruction calling for display of navigator is sent to the electronic equipment.

The predefined movement track mode may have various forms, such as approximately a circle, approximately an ellipse, approximately an equilateral triangle, approximately a square, etc. The predefined movement track mode may also be any predefined movement track. Here, detailed description will be given by using the request mode of the navigator-calling request as a movement track, for purposes of example, though other forms of the request mode may be implemented based upon the present description.

For example, if the request mode of the navigator-calling request is a signal indicating whether a button that calls the navigator is pressed, when the signal is received, the electronic equipment reads the predefined request mode stored in the memory (at this time, the example predefined request mode is a signal indicating that a button that calls the navigator is pressed). If the signal indicating whether a button that calls the navigator is pressed indicates that the button that calls navigator is pressed, that is, it matches with the predefined request mode, then an instruction calling for display of the navigator is sent to the electronic equipment. Also, for example, if the request mode of the navigator-calling request is a shake mode of the electronic equipment, when a shake of the electronic equipment is received, the electronic equipment reads the predefined request mode stored in its memory (at this time, the example predefined request mode is a predefined shake mode of the electronic equipment, such as, rapidly moving twice along a vertical direction or rapidly moving three times along a horizontal direction), and compares the received shake mode of the electronic equipment with the predefined shake mode of the electronic equipment. An instruction calling for display of the navigator is sent to the electronic equipment if the result of the above comparison matches.

FIG. 2 illustratively shows an example of an implementation of closed graphical structures in which respective tabs of the navigator are distributed on at least part of the closed structure.

According to example implementations, the closed structure may be a circle, an ellipse, a circular loop, an elliptical loop, a polygon and the like, and respective tabs may be distributed on the circle, ellipse, circular loop, elliptical loop, polygon, respectively.

Figure 2A:
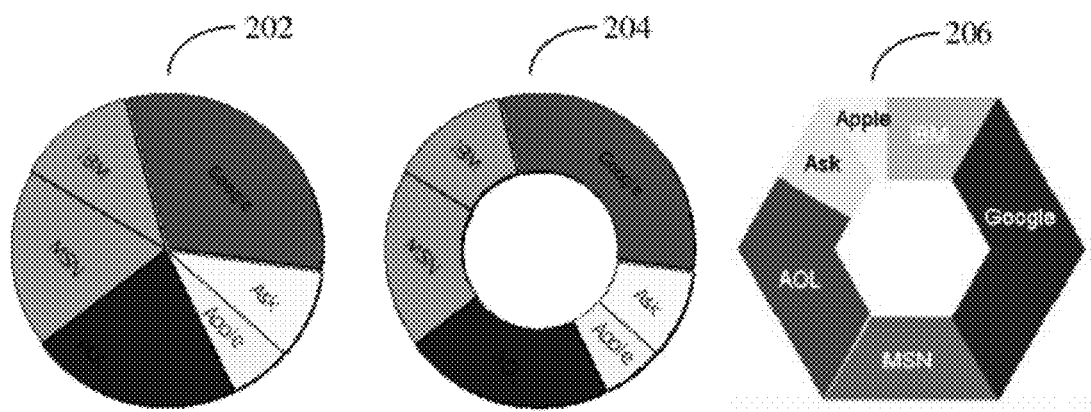
FIG. 2A illustratively shows an example of an implementation of closed graphical structures, including a circle, a circular loop, and a polygon, in which respective tabs of the navigator are distributed on at least part of the closed structure according to an embodiment of the disclosure.

FIG. 2A illustratively shows an example of an implementation of a circle 202, a circular loop 204, and a polygon 206. The description will be given with reference to FIG. 2A.

When the closed structure is the circle 202, respective tabs of the navigator are distributed on the circle 202. That is, each respective tab occupies the circle 202 respectively in a form of a sector.

When the closed structure is the circular loop 204, respective tabs of the navigator are distributed on the circular loop 204. That is, each respective tab occupies the circular loop 204 respectively in a form of a sector loop.

When the closed structure is the polygon 206, respective tabs of the navigator are distributed on the polygon 206. That is, each respective tab is distributed on an edge of the polygon 206. Each respective tab may occupy one or more edges of the polygon 206 respectively, or multiple tabs may occupy one edge of the polygon 206. The polygon 206 may be regular or irregular in shape. The polygon 206 shown in FIG. 2A is a form like a "loop shape." According to an example implementation, the polygon 206 may also be a circle-like full-filled structure.

According to one example implementation, at least one of the multiple tabs is an aggregation tab that represents a set/group of relevant/related tabs.

For example, the set of related tabs may correspond to applications related to social network sites, such as clients of Facebook®, Twitter®, MySpace®, etc. In another example, the set of related tabs may correspond to applications related to instant messaging, such as clients of MSN® Messenger, ICQ®, Jabber®, Skype®, Yahoo® Messenger, GTalk®, etc.

For example, the set of related tabs may all include web pages of a child web site relevant to a web site www.company.com, such as web pages of four relevant child web sites belonging to the home site www.company.com as follows:
   www.company.com/solutions/us/en,
   www.company.com/technologyservices/us/en,
   www.company.com/products/us/en, and
   www.company.com/support/us/en.

The set of related tabs in another example may all include web pages of a child web site relevant to a web site www.searchComany.com, such as web pages of ten relevant child web sites belonging to the home site www.searchComany.com as follows:
   gmail.searchComany.com
   news.searchComany.com
   maps.searchComany.com
   image.searchComany.com
   video.searchComany.com
   docs.searchComany.com
   books.searchComany.com
   translate.searchComany.com
   scholar.searchComany.com
   picasaweb.searchComany.com According to one example implementation, an area of an aggregation tab is proportional to a number of tabs represented by the aggregation tab. Taking the above described content for example, it is assumed that the set of tabs represented by aggregation tab one (1) corresponds to applications relevant to social network sites, such as three clients of Facebook®, Twitter®, and MySpace®. The set of tabs represented by aggregation tab two (2) corresponds to applications relevant to instant messaging, such as six clients of MSN® Messenger, ICQ®, Jabber®, Skype®, Yahoo® Messenger, and GTalk®. According to the above example implementation, there should be a relationship/ratio of one to two (1:2) between an area of aggregation tab one (1) and an area of aggregation tab two (2). Still taking the above described content for example, it is assumed that a set of tabs represented by an aggregation tab three (3) corresponds to web pages of four child web sites relevant to web site www.company.com, and a set of tabs represented by an aggregation tab four (4) corresponds to web pages of ten child web sites relevant to web site www.searchCompany.com. According to the above example implementation, there should be a relationship/ratio of two to five (2:5) between an area of the aggregation tab three (3) and an area of aggregation tab four (4). According to another example, an area of an aggregation tab and a number of tabs represented by the aggregation tab are in a relationship of increasing function, that is, the area of the aggregation tab increases as the number of tabs represented by the respective aggregation tab increases.

According to other example implementations, the closed structure may be a circle, an ellipse, a circular loop, an elliptical loop, a polygon, and the like. Accordingly, part of the closed structure may be part of a circle, an ellipse, a circular loop, an elliptical loop, a polygon, and the like.

Figure 2B:
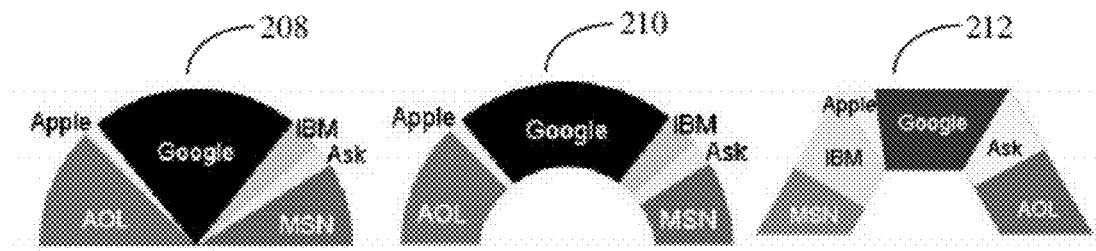
FIG. 2B illustratively shows an example of an implementation of closed graphical structures, including part of a circle, part of a circular loop, and part of a polygon, in which respective tabs of the navigator are distributed on at least part of the closed structure according to an embodiment of the disclosure.

FIG. 2B illustratively shows an example of an implementation of part of a circle 208, part of a circular loop 210, and part of a polygon 212. The description will be given with reference to FIG. 2B.

When the part of the closed structure is the part of the circle 208, respective tabs of the navigator are distributed on the part of the circle 208. That is, each respective tab occupies part of the partial circle respectively in a form of a sector.

When the part of the closed structure is the part of the circular loop 210, respective tabs of the navigator are distributed on the part of the circular loop 210. That is, each respective tab occupies part of the partial circular loop respectively in a form of a sector loop.

When the part of the closed structure is the part of the polygon 212, respective tabs of the navigator are distributed on the part of the polygon 212. That is, each respective tab is distributed on an edge of the part of the partial polygon 212. Each respective tab may occupy one or more edges of the part of the partial polygon 212 respectively, or multiple tabs may occupy one edge of the part of the partial polygon 212. The polygon may be regular or irregular.

According to one example implementation, at least one of the set of tabs is an aggregation tab that represents a set of related tabs. According to another example implementation, an area of an aggregation tab is proportional to the number of tabs represented by the aggregation tab. For detailed description, please refer to the above description, which is omitted here for brevity.

The various example implementations described above are illustrative and not all of them are enumerated. The present subject matter may be implemented as long as tabs are distributed on at least part of the closed structure, and any closed structure will fall into the inventive concept of the present subject matter.

Returning to the description of FIG. 1, the process 100 for controlling electronic equipment with the touching-type signal input device according to another example implementation will be further described in conjunction with FIG. 1 (see the dashed line boxes in FIG. 1).

According to one example implementation, in step 112, in response to a tab being selected, preview of content corresponding to the selected tab is displayed. Here, according to one example implementation, if the selected tab is an aggregation tab, the preview includes a set of previews of content corresponding to a set of tabs represented by that aggregation tab.

Then, according to another example implementation, in step 114, in response to one of the set of previews being selected, content corresponding to the selected preview is displayed, and at step 116, the process 100 ends.

The process of how to realize displaying of preview of content corresponding to the selected tab and the like will be illustratively described below. The following description is illustrative, and any other approach may be employed to realize displaying of preview of content corresponding to the selected tab. Which approach will be employed may be selected at implementation.

In response to a tab being selected, identification information of a web page or application corresponding to the tab is sent to the electronic equipment. If the tab corresponds to a web page, the electronic equipment will utilize identification information to pre-fetch the web page and display the fetched content to the user in the form of a preview. If the tab corresponds to an application, the electronic equipment will utilize identification information to read corresponding content of the application for preview and display it to the user in the form of a preview. How to pre-fetch a web page and read content of an application for preview are omitted for brevity.

If the selected tab is an aggregation tab, multiple pieces of identification information of a set of web pages or the set of applications corresponding to the aggregation tab are sent to the electronic equipment. If the aggregation tab corresponds to a web page, the electronic equipment will utilize identification information to pre-fetch the set of web pages, and display the fetched content to the user in the form of a preview. If the aggregation tab corresponds to an application, the electronic equipment will utilize identification information to read corresponding content of the set of applications for preview and display it to the user in the form of a preview. At this time, the preview will include a set of previews of content corresponding to a set of tabs represented by that aggregation tab, such as preview of a set of web pages or a set of applications.

In response to one of the set of previews being selected, identification information of the web pages or the applications corresponding to the selected tab is sent to the electronic equipment, and the electronic equipment will use the identification information to read the requested web pages or applications and display them to the user.

Figure 3:
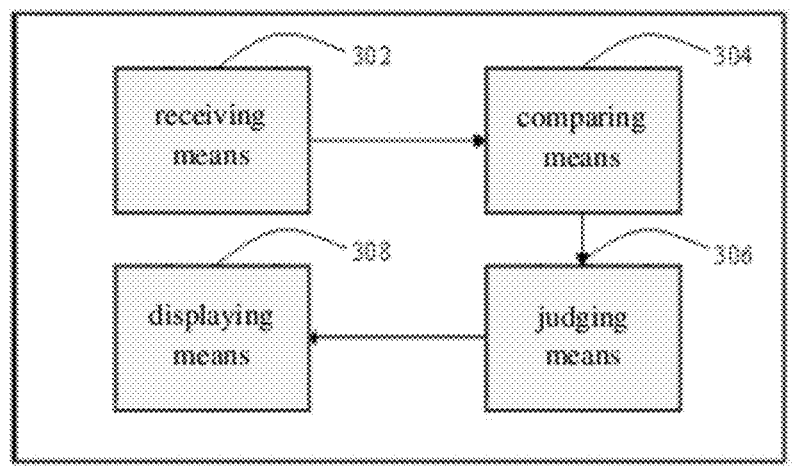
FIG. 3 is a block diagram of an example of an implementation of a system for controlling electronic equipment with a touching-type signal input device according to an embodiment of the disclosure.

Referring to FIG. 3, a block diagram of an example of an implementation of a system 300 for controlling electronic equipment with a touching-type signal input device is shown. The system 300 includes receiving means 302 configured to receive an inputted navigator-calling request, comparing means 304 configured to compare the request mode of the inputted navigator-calling request with a predefined request mode, judging means 306 configured to determine whether the request mode of the inputted navigator-calling request matches with the predefined request mode, and displaying means 308 configured to display the navigator in response to determining the result is a match, where the navigator has a set of tabs distributed on at least part of a closed structure. The closed structure may be a circle, an ellipse, a circular loop, an elliptical loop, a polygon, and the like. According to one example implementation, the request mode of the navigator-calling request is movement track. In response to receiving inputted movement track, the inputted movement track is compared with a predefined movement track. If the inputted movement track matches with the predefined movement track, the navigator is displayed. According to another example implementation, the request mode of the navigator-calling request is a signal indicating whether a button that calls the navigator is pressed. According to still another example implementation, the request mode of the navigator-calling request is movement of the electronic equipment itself, such as a shake of the electronic equipment.

According to one example implementation, at least one of the set of tabs is an aggregation tab and the aggregation tab represents a set of relevant tabs. According to one example implementation, an area of aggregation tab is proportional to the number of tabs represented by the aggregation tab. According to one example implementation, in response to a tab being selected, the displaying means 308 displays a preview of content corresponding to the selected tab. If the selected tab is an aggregation tab, the preview includes a set of previews of content corresponding to a set of tabs represented by that aggregation tab. In response to one of the set of previews being selected, the displaying means 308 displays content corresponding to the selected preview.

The process of how to realize displaying of preview of content corresponding to the selected tab and the like will be illustratively described below. The following description is illustrative, and any other approach may be employed to realize displaying of a preview of content corresponding to the selected tab. Which approach will be employed may be selected at the time of implementation.

In response to a tab being selected, identification information of a web page or an application corresponding to the tab is sent to the electronic equipment. If the tab corresponds to a web page, the electronic equipment will utilize identification information to pre-fetch the web page and send the fetched content to the displaying means 308 for displaying to the user in the form of a preview. If the tab corresponds to an application, the electronic equipment will utilize identification information to read corresponding content of the application for preview and send it to the displaying means 308 for displaying to the user in the form of a preview. How to pre-fetch a web page or read content of an application for preview are omitted for brevity.

If the selected tab is an aggregation tab, multiple pieces of identification information of a set of web pages or a set of applications corresponding to the aggregation tab are sent to the electronic equipment. If the aggregation tab corresponds to a web page, the electronic equipment will utilize the identification information to pre-fetch the set of web pages and send the fetched content to the displaying means 308 for displaying to the user in the form of a preview. If the aggregation tab corresponds to an application, the electronic equipment will utilize the identification information to read corresponding content of the set of applications for preview and send it to the displaying means 308 for displaying to the user in the form of a preview. At this time, the preview will include a set of previews of content corresponding to a set of tabs represented by that aggregation tab, such as a preview of a set of web pages or a set of applications.

In response to one of the set of previews being selected, identification information of the web page or the application corresponding to the selected tab is sent to the electronic equipment, and the electronic equipment will utilize the identification information to read the requested web page or application and send it to the displaying means 308 for displaying to the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for controlling electronic equipment with a touching-type signal input device, comprising:
   receiving an inputted navigator-calling request that specifies a user request to navigate among a set of previously-opened views of at least one of web pages and applications;
   comparing a request mode of the inputted navigator-calling request with a predefined request mode associated with navigation among the set of previously-opened views of the at least one of web pages and applications;

determining whether the request mode of the inputted navigator-calling request matches with the predefined request mode; and displaying an open-views navigator in response to determining there is a match, where the open-views navigator comprises a plurality of open-views tabs distributed on at least part of a closed structure that each allow selective navigation to at least one of a previously-opened application view and a previously-opened web page view from the set of previously-opened views;

where at least one tab of the plurality of open-views tabs is an aggregation tab that represents a plurality of related open-views tabs that access one of a plurality of related previously-opened application views and a plurality of related previously-opened web page views, where an area of the aggregation tab increases as a number of the plurality of related open-views tabs represented by the aggregation tab increases responsive to additional opened related views.

2. The method of claim 1, where the request mode of the inputted navigator-calling request comprises a predefined shake mode of the electronic equipment defined as one of a number of rapid user movements of the electronic equipment along a vertical direction and a number of rapid user movements of the electronic equipment along a horizontal direction.

3. The method of claim 1, where the closed structure of the open-views navigator comprises a circle.

4. The method of claim 1, where the closed structure of the open-views navigator comprises an ellipse.

5. The method of claim 1, where the closed structure of the open-views navigator comprises a circular loop.

6. The method of claim 1, where the closed structure of the open-views navigator comprises an elliptical loop.

7. The method of claim 1, where the closed structure of the open-views navigator comprises a polygon.

8. The method of claim 1, where the area of the aggregation tab is proportional to the number of the plurality of related open-views tabs represented by the aggregation tab.

9. The method of claim 1, further comprising displaying, in response to an open-views tab of the plurality of open-views tabs being selected, a content preview of one of application content and web page content corresponding to the selected open-views tab.

10. The method of claim 9, where, if the selected open-views tab comprises the aggregation tab, the content preview of the one of the application content and the web page content comprises a plurality of content previews of content of one of a plurality of applications and a plurality of web pages corresponding to the plurality of related open-views tabs represented by that aggregation tab.

11. The method of claim 10, further comprising displaying, in response to one of the plurality of content previews of content of the one of the plurality of applications and the plurality of web pages being selected, the content corresponding to the respective one of the respective application and web page associated with the selected content preview of content.

12. A system for controlling electronic equipment with a touching-type signal input device, comprising:

a display; and a processor programmed to:

receive an inputted navigator-calling request that specifies a user request to navigate among a set of previously-opened views of at least one of web pages and applications;

compare a request mode of the inputted navigator-calling request with a predefined request mode associated with navigation among the set of previously-opened views of the at least one of web pages and applications;

determine whether the request mode of the inputted navigator-calling request matches with the predefined request mode; and display an open-views navigator in response to determining there is a match on the display, where the open-views navigator comprises a plurality of open-views tabs distributed on at least part of a closed structure that each allow selective navigation to at least one of a previously-opened application view and a previously-opened web page view from the set of previously-opened views;

where at least one tab of the plurality of open-views tabs is an aggregation tab that represents a plurality of related open-views tabs that access one of a plurality of related previously-opened application views and a plurality of related previously-opened web page views, where an area of the aggregation tab increases as a number of the plurality of related open-views tabs represented by the aggregation tab increases responsive to additional opened related views.

13. The system of claim 12, where the request mode of the inputted navigator-calling request comprises a predefined shake mode of the electronic equipment defined as one of a number of rapid user movements of the electronic equipment along a vertical direction and a number of rapid user movements of the electronic equipment along a horizontal direction.

14. The system of claim 12, where the area of the aggregation tab is proportional to the number of the plurality of related open-views tabs represented by the aggregation tab.

15. The system of claim 12, where the processor is further programmed to display, in response to an open-views tab of the plurality of open-views tabs being selected, a content preview of one of application content and web page content corresponding to the selected open-views tab.

16. The system of claim 15, where if, the selected open-views tab comprises the aggregation tab, the content preview of the one of the application content and the web page content comprises a plurality of content previews of content of one of a plurality of applications and a plurality of web pages corresponding to the plurality of related open-views tabs represented by that aggregation tab.

17. The system of claim 16, where the processor is further programmed to display, in response to one of the plurality of content previews of content of the one of the plurality of applications and the plurality of web pages being selected, the content corresponding to the respective one of the respective application and web page associated with the selected content preview of content.

18. A computer program product comprising a non-transitory computer readable storage medium including computer readable program code, where the computer readable program code when executed on a computer causes the computer to:

receive an inputted navigator-calling request that specifies a user request to navigate among a set of previously-opened views of at least one of web pages and applications;

compare a request mode of the inputted navigator-calling request with a predefined request mode associated with navigation among the set of previously-opened views of the at least one of web pages and applications;

determine whether the request mode of the inputted navigator-calling request matches with the predefined request mode; and display an open-views navigator in response to determining there is a match, where the open-views navigator comprises a plurality of open-views tabs distributed on at least part of a closed structure that each allow selective navigation to at least one of a previously-opened application view and a previously-opened web page view from the set of previously-opened views;

where at least one tab of the plurality of open-views tabs is an aggregation tab that represents a plurality of related open-views tabs that access one of a plurality of related previously-opened application views and a plurality of related previously-opened web page views, where an area of the aggregation tab increases as a number of the plurality of related open-views tabs represented by the aggregation tab increases responsive to additional opened related views.

\* \* \* \* \*